Patented July 22, 1924.

1,501,894

UNITED STATES PATENT OFFICE.

ROGER ADAMS AND JOHN RAVEN JOHNSON, OF URBANA, ILLINOIS.

COMPOUND HAVING A TRYPANOCIDAL ACTION.

No Drawing.    Application filed December 27, 1921. Serial No. 525,159.

*To all whom it may concern:*

Be it known that we, ROGER ADAMS and JOHN RAVEN JOHNSON, citizens of the United States, and residents of Urbana, Champaign County, Illinois, have invented certain new and useful Improvements in Compounds Having a Trypanocidal Action, of which the following is a specification.

The invention relates to compounds which have a trypanocidal action and provides a new series prepared by the condensation of aromatic primary amines holding a group containing an arsenic atom with pyruvic acid and a suitable aldehyde. These substances are presumably quinoline 4-carboxylic acid derivatives or 1-phenly 4, 5-diketopyrrolidine derivatives. They dissolve readily in alkalies to give solutions which can be used in the treatment of diseases caused by trypanosomes.

*General method of synthesizing compounds of this series.*—An aromatic primary amine which has a hydrogen in the ring substituted by a group which holds an arsenic atom, is suspended or dissolved in some solvent such as alcohol, and treated with a molecule of an aromatic or a suitable aliphatic aldehyde and a molecule of pyruvic acid. The mixture is refluxed for one to three hours, after which the reaction mixture is allowed to cool. The compounds either separate out directly or after evaporation of part of the solvent. These substances are readily purified by recrystallization from the common organic solvents.

*A specific compound.*—A mixture of 21.7 g. (1 molecule) of arsanilic acid, 10.6 g. of benzaldehyde (1 molecule) and 200 c. c. of absolute alcohol is heated to boiling under reflux on a steam bath. After a short while, most of the arsanilic acid passes into solution and 8.8 g. of pyruvic acid (1 molecule) are now added. The solution is heated to boiling for three and one-half to four hours, and then filtered hot to remove a slight amount of insoluble material. On cooling the filtrate, a yellow precipitate results which is filtered, washed sparingly with cold alcohol, finally with ether and then dried in vacuo. The crude substance, presumably 2-phenylquinoline-4-carboxylic acid-6-arsonic acid, 1, 2-diphenyl 4, 5-diketopyrrolidine 4' thus obtained is pale yellow in color. By crystallization from an ordinary alcohol and washing with alcohol followed by ether, the substance may be purified and is then a cream colored powder which starts to darken at about 180° and melts with decomposition at 186–187° (Cor.).

The order of addition of the aldehyde and pyruvic acid is of little importance; both may be added at once and essentially the same results are obtained.

The compound forms a neutral two molecules of alkali and a slightly alkaline solution with three molecules. From a solution in two molecules of sodium hydroxide, copper sulfate precipitates a green salt; silver, lead, mercurous, mercuric, cadmium nitrates light yellow salts, and cobalt and ferric nitrates reddish brown salts.

Other specific members belonging to this series are: compound made from anisaldehyde, arsanilic acid and pyruvic acid is yellow, darkens at 159° and melts with decomposition at 164–5°; compound made from ortho-methoxybenxaldehyde, arsanilic acid and pyruvic acid is yellow, darkens at 165° and melts with decomposition at 173–176°; compound made from para-chlorobenzaldehyde, arsanilic acid and pyruvic acid is cream-colored, darkens at 160° and melts with decomposition at 163–5°, compound made from para-bromobenzaldehyde, arsanilic acid and pyruvic acid is cream-colored and decomposes at 150–155°; compound made from piperonal, arsanilic acid and pyruvic acid is yellow, darkens at 170–175° and melts with decomposition at 176–8°; compound from ortho-nitrobenzaldehyde, arsanilic acid and pyruvic acid is deep yellow and decomposes at 176–180°.

A specific member using an aldehyde which is not aromatic in character is produced from cinnamic aldehyde, arsanilic acid and pyruvic acid. It is brown and does not melt below 250° but on keeping at 220–240° very gradually decomposes giving off carbon dioxide.

A specific member containing other arsenic containing groups besides the arsonic acid is made from para-aminophenyl arsinic (acid) acetanilide [(P)$NH_2C_6H_4AsO_2$-$HCH_2CONHC_6H_5$ made by the action of chloro-acetanilide upon sodium para-aminophenyl arsenite] benzaldehyde and pyruvic acid. It is yellow, darkens at 170° and melts with decomposition at 173–5°.

Analogous products to those described can be prepared by allowing benzaldehyde and pyruvic acid to react with substituted amino phenyl arsonic acids such, for example, as methyl amino arsonic acid. Ortho-arsanilic acid reacts with benzaldehyde and pyruvic acid to produce a yellow compound darkening at 245° and melting with decomposition at 253–4°.

These substances form in yields varying from 20 to 75% of the theory. They are generally accompanied by the formation of a certain amount of sticky material which, however, is generally readily removed by various solvents. They are only very slightly soluble in water but readily soluble in alkalies to give solutions of the salts which possess trypanocidal action. They can be crystallized from the common organic solvents. They are, for the most part, high melting substances ranging from colorless to a deep yellow brown, but generally cream colored. They all dissolve in alkali hydroxides and most of them give a slightly acid solution with one molecule of alkali, a neutral solution with two molecules and a slightly alkaline solution with three molecules. When heated up they decompose and give off carbon dioxide sufficient to correspond to one molecule per molecule of substance. Very few of these compounds give sharp melting or decomposition points. These points vary slightly with the method of heating when the determination is made.

The derivatives from the simple aliphatic aldehydes form only with great difficulty or are at least difficult to isolate but from more complex aliphatic aldehydes such as cinnamic aldehyde the product may be obtained in the usual way.

The invention is defined in the appended claims which should be interpreted as broadly as is consistent with the state of the art.

We claim as our invention:—

1. As a new article of manufacture, a compound derived by the action of a primary aromatic amine with a hydrogen in the ring substituted by a group containing an arsenic atom upon pyruvic acid and an aldehyde.

2. As a new article of manufacture, a compound derived by the action of a primary aromatic amine with a hydrogen in the ring substituted by a group containing an arsenic atom upon pyruvic acid and an aromatic aldehyde.

3. As a new article of manufacture, the compound derived by the action of arsanilic acid upon pyruvic acid and benzaldehyde, which is a cream colored solid melting with decomposition at 186–7° (Cor.) and which upon dissolving in alkalies gives a solution having a trypanocidal action.

4. The method of forming compounds having a trypanocidal action which consists in reacting upon pyruvic acid and an aldehyde with a primary aromatic amine having a hydrogen in the ring substituted by a group containing an arsenic atom.

ROGER ADAMS.
JOHN RAVEN JOHNSON.